C., A. & C. N. CLOW.
Straw-Fork.
No. 18,804.  Patented Dec. 8. 1857.
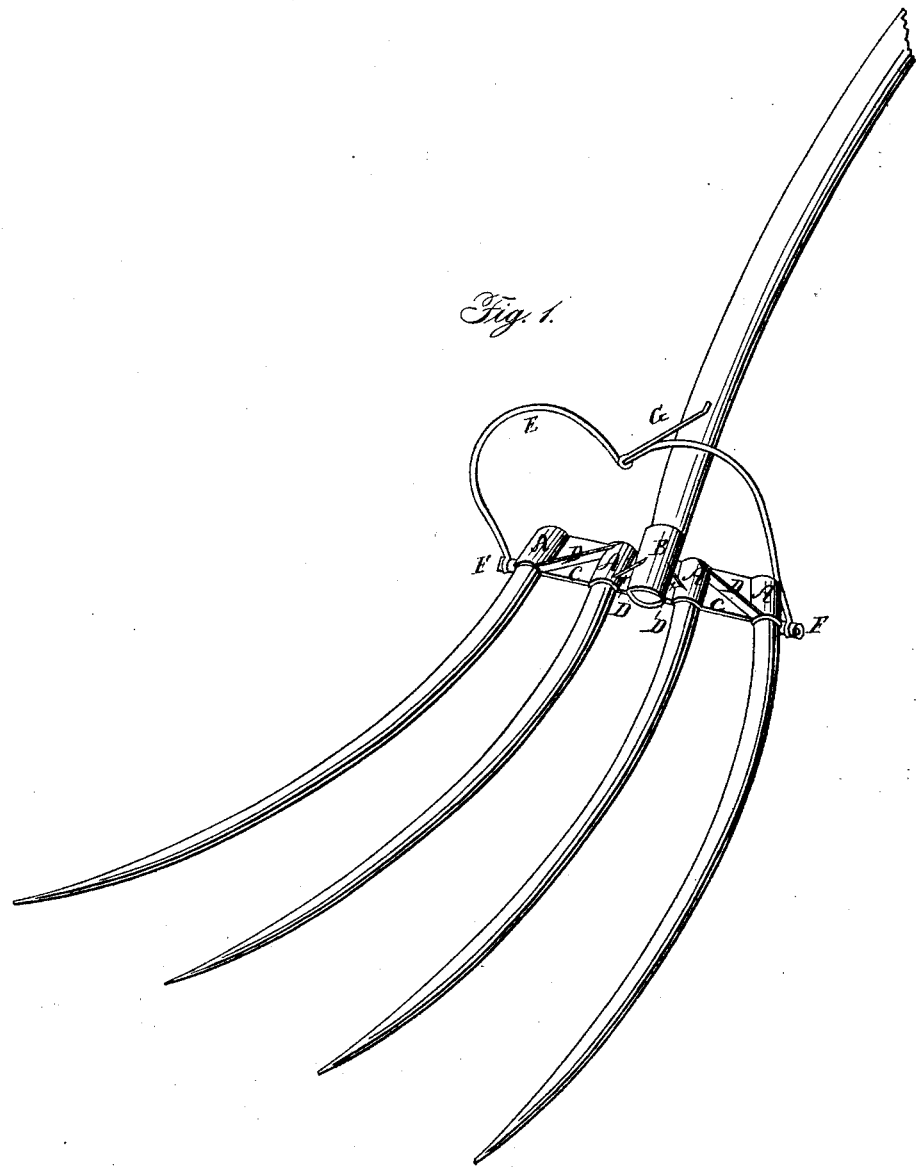
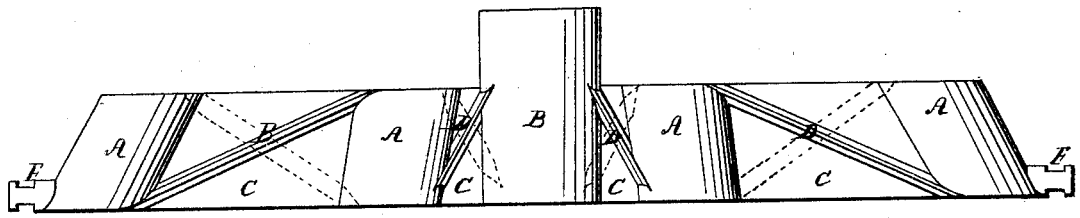

UNITED STATES PATENT OFFICE.

CHAS. CLOW, ABRAM CLOW, AND CHAS. N. CLOW, OF PORT BYRON, N. Y.

IMPROVEMENT IN AGRICULTURAL FORKS.

Specification forming part of Letters Patent No. 18,804, dated December 8, 1857.

*To all whom it may concern:*

Be it known that we, CHARLES CLOW, ABRAM CLOW, and CHARLES N. CLOW, of Port Byron, in the county of Cayuga and State of New York, have invented a new and useful Improvement in Straw and Barley Forks; and we do hereby declare that the following is a full and exact description thereof, reference being had to the accompanying drawings, making part of this specification, in which—

Figure 1 is a perspective view of the fork, and Fig. 2 is a plan of the metallic head of the full size.

Like letters designate like parts in both figures.

The nature of our invention consists in employing a peculiarly-constructed cast malleable iron head, said peculiarity consisting in the arrangement of the sockets for the reception of the tines in relation to the socket in which the handle is inserted, and in the manner of bracing said head to insure the greatest strength with a given weight of metal, and also in the manner of attaching the bow to the head, so as to permit its being turned down onto the tines to facilitate the packing of a number of forks together.

To enable others to make our invention, we will proceed to describe its construction.

We use, as before stated, a cast malleable iron head, which head consists of a series of sockets, used for the insertion of the tines and handle, with solid metal connections between them, all cast in one piece. The sockets that hold the tines are usually spread about three and one-fourth inches from center to center, and are arranged at acute angles in relation to the socket in which the handle is inserted, the two inside ones forming an angle of about ten and the two outside ones of about thirty degrees, said socket for the handle being located midway between the two inside ones that hold the tines. The angles may be varied to make forks of different shapes and widths, but always form acute angles with the handle-socket. These sockets are thus arranged to secure the right width and shape of the fork with tines that are curved in one direction only. This will all be clearly seen by reference to the drawings, where A A represent the sockets for the tines; B, the socket for the handle, and C C the solid connecting parts between them. The sockets are tapering, the largest diameter being toward the handle.

The solid connecting parts of the head are braced to resist the torsional strain to which they are subjected by ribs or braces cast on both sides of the head running obliquely or diagonally across the solid connecting parts in a straight line from the front side of one socket to the back side of another, those on one side of the head being exactly the reverse of those on the other—that is, when the brace on the top is connected to the front of a socket the brace immediately opposite it, on the under side of the head, is connected to the rear end of the same socket. This will be clearly understood by reference to Fig. 2, where D D represent the diagonal ribs or braces, those on the under side being represented by dotted lines.

The tines are of wood, and are turned in a lathe to the desired size, and have the same taper at the large end of the socket in the head. They are then steamed and bent, having but one crook given them, which is a regular curve, and after being thoroughly seasoned are driven into the sockets from the back side, the points being carried a little inward as they are being driven in to give the desired shape to the fork. The handle is also turned, bent, and driven into its appropriate socket in a similar manner.

E is a wire bow at the back end of the fork to prevent the straw from sliding off when the fork is elevated, and the peculiar manner in which it is attached to the head is a part of our improvement. It is as follows: At each extremity of the head is a small cylindrical projection, F F, which have grooves around them. The ends of the wire bow E are bent around in these grooves, thus forming a hinge-joint, which permits the bow to be turned down onto the tines by disengaging the brace G from the handle, said brace being jointed onto the bow so it will also lay down onto the tines. When the bow is thus turned down one fork or bundle of forks can be laid on another without trouble, and the inconvenience usually experienced in packing is thereby avoided.

We wish to call particular attention to the arrangement of the sockets in which the tines are inserted, for it is this arrangement which enables us to use a metallic head for this kind of fork, which is very large, the tines being thirty inches long, and spread twenty inches wide at the points, and which has hitherto been constructed entirely of wood. It will be seen on observation that a metallic head in which the sockets for the tines were parallel with the socket in which the handle is inserted cannot be made, for it would have to be twenty inches long to give the width of the fork, and would therefore have to be so heavy to secure the requisite strength as to preclude its use altogether; nor could it be made short and have the sockets for the tines set in that manner, for in that case the fork would either be too narrow or the tines would have to be bent outward, and then again inward, close to the head, besides the regular curve required, and in such short curves that wood (the material employed for them) could not be bent. By our improvement, however, these difficulties are obviated. The head is comparatively short, yet by the sockets for the tines being arranged in the manner specified the width of the fork is preserved with tines that are curved in one direction only, all that is necessary being to carry the points a little inward in driving them in. Sufficient strength in the head, combined with the required lightness, is obtained by means of the oblique cross bars or braces before referred to. The strain to which the head is subjected being a torsional one, the peculiar arrangement of these braces, which forms a part of our improvement, offers the greatest resistance to such a strain that can be obtained with the same weight of metal. The advantages gained by jointing the bow to the head in the manner described are sufficiently obvious without further notice.

We are aware that manure-forks have been constructed with cast malleable iron blades with sockets for the tines; but in all such forks the sockets have been parallel with the socket in which the handle was inserted, which cannot be done with barley-forks, for reasons heretofore given. We therefore wish it expressly understood that we do not claim a fork constructed with a cast malleable iron head, of itself considered, nor any such head in which the sockets for the tines are parallel to the socket in which the handle is inserted; but What we do claim as our invention, and desire to secure by Letters Patent, is—

Jointing the bow E onto the head for the purpose and in the manner substantially as described.

The above specification of our improved straw and barley fork signed this 6th day of October, 1857.

CHARLES CLOW.
ABRAM CLOW.
CHAS. N. CLOW.

Witnesses:
C. W. HAYNES,
J. W. PICKETT.